United States Patent [19]

Ariga et al.

[11] 4,085,018
[45] Apr. 18, 1978

[54] PHOTOCURABLE RESIN COMPOSITIONS

[75] Inventors: Nagao Ariga, Ichihara; Junji Nanbu; Hiroshi Oikawa, both of Chiba, all of Japan

[73] Assignee: Dainippon Ink and Chemicals, Inc., Tokyo, Japan

[21] Appl. No.: 764,997

[22] Filed: Feb. 2, 1977

[30] Foreign Application Priority Data

Feb. 10, 1976  Japan .................................. 51-12843

[51] Int. Cl.$^2$ .......................... C08L 63/00; C08F 8/00
[52] U.S. Cl. .......................... 204/159.15; 204/159.19; 204/159.23; 204/159.24; 260/835; 260/836; 260/837 R
[58] Field of Search ....................... 260/836, 837, 835; 204/159.15

[56] References Cited

U.S. PATENT DOCUMENTS

| | | | |
|---|---|---|---|
| 3,256,226 | 6/1966 | Fekete | 260/837 R |
| 3,450,613 | 6/1969 | Steinberg | 260/837 R |
| 3,773,856 | 11/1973 | Takiyama | 260/836 |
| 3,808,114 | 4/1974 | Tsuchihara | 260/835 |
| 3,892,819 | 7/1975 | Najvar | 260/837 R |

*Primary Examiner*—Paul Lieberman
*Attorney, Agent, or Firm*—Wenderoth, Lind & Ponack

[57] ABSTRACT

A photocurable resin composition comprising (I) an unsaturated polyester resin obtained by reacting (B) an epoxy compound containing at least about 2 epoxy groups per molecule obtained by reacting metylidene diphenol with β-methylepichlorohydrin or epichlorohydrin, with (C) an unsaturated monobasic acid in the presence or absence of (A) a dicarboxylic acid containing at least 4 methylene groups interposed between the two carboxyl groups, or a carboxyl-terminated oligopolyester obtained by esterifying a saturated or unsaturated dibasic acid with a polyhydric alcohol, (II) a polymerizable vinyl monomer capable of addition polymerization with the unsaturated polyester resin (I), and (III) a photopolymerization initiator having an action of promoting radical polymerization by the irradiation of light.

7 Claims, No Drawings

PHOTOCURABLE RESIN COMPOSITIONS

This invention relates to a photocurable resin composition capable of being rapidly cured. More specifically, the invention relates to a resin composition rapidly curable by photopolymerization, which comprises as a main ingredient a specific unsaturated polyester resin derived from an epoxy compound which has at least about 2 epoxy groups per molecule and is obtained by the addition reaction of methylidene diphenol (to be referred to hereinbelow as "Bisphenol F") with β-methylepichlorohydrin or epichlorohydrin.

In order to prevent environmental pollution and to save resources, it has recently been an important subject in industrial technology to develop paints and painting processes which are non-polluting, energy-saving, and highly productive. Investigations in an attempt to meet this demand have resulted in the commercial acceptance of non-aqueous dispersion paints, powder paints, water-borne paints, and high non-volatile content paints. These paints, however, are not entirely satisfactory in comparison with convensional types from economic view-points including the shortening of the curing time (high productivity), the possibility of reducing the amounts of organic solvents (pollution control), and the possibility of reducing the cost of energy (energy-saving). In an attempt to remove this disadvantage, a radiation curing process whereby coated films are cured by means of a new type of energy was suggested. This new process includes electron beam curing and ultraviolet curing. The former has not yet come into practical use because of economic considerations, but the latter has been accepted in coating applications for wood and paper and in the printing industry.

In order, however, to broaden the area of application of such a technique to other coating substrates, it is desired to develop paints which are (1) rapidly curable, (2) of low viscosity with good adhesiveness to flexible metals and a very low content of a volatile solvent, (3) curable in the air, (4) free from offensive odors, and (5) free from toxicity.

It is an object of this invention therefore to provide a resin composition useful for preparing paints which meet these requirements.

Other objects of the invention will become apparent from the following description.

The present inventors noticed that the abovementioned specific unsaturated polyester resins exhibit superior performance in protecting base materials or substrates because of their good adhesion to the base materials and good flexibility. Investigations based on this face led to the discovery that the above object can be achieved by a resin composition comprising a certain unsaturated polyester resin having a methylidene diphenyl structure

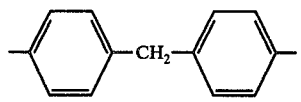

in the main chain, a polymerizable vinyl monomer, and a photopolymerization initiator.

According to the present invention, there is provided a photocurable resin composition comprising (I) an unsaturated polyester resin obtained by reacting (B) an epoxy compound containing at least about 2, preferably up to about 10, epoxy groups per molecule obtained by reacting methylidene diphenol with β-methylepichlorohydrin or epichlorohydrin, with (C) an unsaturated monobasic acid in the presence or absence of (A) a dicarboxylic acid containing at least 4 methylene groups interposed between the two carboxyl groups, or a carboxyl-terminated oligopolyester obtained by esterifying a saturated or unsaturated dibasic acid with a polyhydric alcohol, (II) a polymerizable vinyl monomer capable of addition polymerization with the unsaturated polyester resin (I), and (III) a photopolymerization initiator having an action of promoting radical polymerization by the irradiation of light.

Conventional resin compositions containing as main ingredients unsaturated ester resins derived from epoxy compounds of bisphenol A type have superior properties such as adhesion to base materials and flexibility, but have the defect that their rate of curing under ultraviolet rays is slow, and they are difficult to make into paints because of their high viscosity. In contrast, the resin composition of this invention containing as a main ingredient the unsaturated polyester resin (I) containing a methylidene diphenyl structure is advantageous in that (1) the rate of curing under ultraviolet rays is about 3 times as high as in the conventional resin compositions; (2) it can be used as a high solid paint because of its low viscosity; and (3) its adhesiveness and flexibility are equal to or better than those of the conventional resin compositions.

The advantage (1) is presumably because the methylene groups contained in the methylidene diphenyl structure in the resin skeleton readily undergoes a hydrogen transfer reaction under ultraviolet rays and acts as a crosslinking site. The advantage (2) is presumably because the methylidene diphenyl structure increases the rotatability of the molecules as compared with the use of bisphenol A, thus decreasing the viscosity of the resin.

Typical examples of the "dicarboxylic acid containing at least 4 methylene groups interposed between the two carboxyl groups" are adipic acid, sebacic acid, azelaic acid, dodecanedicarboxylic acid, dimeric acid, polybutadienedicarboxylic acid, and a carboxyl-terminated butadiene/acrylonitrile copolymer. Dicarboxylic acids containing up to about 200 methylene groups interposed between the two carboxyl groups are now available commercially. Hence, in the present invention, dicarboxylic acids containing 4 to 200 methylene groups interposed between the two carboxyl groups can be conveniently used.

The "carboxyl-terminated oligopolyester" as component (A) is obtained by an esterification reaction between a saturated or unsaturated dibasic acid and a polyhydric alcohol as described hereinabove. Those having a long molecular chain are not beneficial, and usually those of relatively simple structures, for example, reaction products formed between 2 to 4 moles of dibasic acids and 1 to 3 moles of polyhydric alcohols, are preferred. Accordingly, the carboxyl-terminated oligopolyester preferably has a number average molecular weight of about 300 to about 3,000.

Typical examples of the "saturated or unsaturated dibasic acid" included not only "dicarboxylic acids containing at least 4 methylene groups interposed between the two carboxyl groups" as described hereinabove, but also maleic anhydride, fumaric acid, citraconic acid, itaconic acid, phthalic anhydride, isophthalic acid, terephthalic acid, tetrahydrophthalic anhydride, hexahydrophthalic anhydride, methyltetrahydrophthalic anhydride, and hexachlorophthalic anhydride. They can be used either alone or in admixture of two or more.

Examples of the "polyhydric alcohol" include ethylene glycol, diethylene glycol, triethylene glycol, polyethylene glycol, propylene glycol, dipropylene glycol, tripropylene glycol, polypropylene glycol, 1,3-butylene glycol, 1,4-butylene glycol, 1,5-hexanediol, 1,6-hexanediol, 2,3-butanediol, neopentyl glycol, trimethylene glycol, hydrogenated bisphenol, an adduct of bisphenol A with ethylene oxide, and an adduct of bisphenol A with propylene oxide.

When adipic acid, for example, is used as the dibasic acid, the carboxyl-terminated oligopolyester can be prepared by reacting adipic acid with a polyhydric alcohol at a temperature of 180° to 220° C. This reaction can be carried out without using a catalyst in particular. If desired, the conventional catalysts for esterification reaction can also be used.

The carboxyl-terminated oligopolyester obtained from adipic acid and a polyhydric alcohol has the following structure

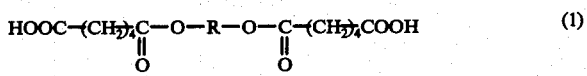   (1)

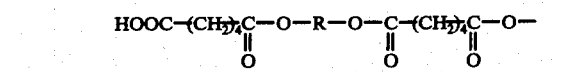

   (2)

or

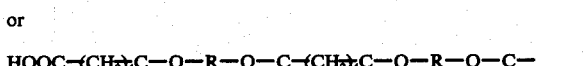

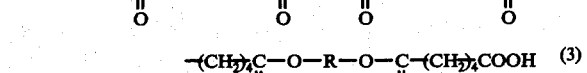   (3)

(In the above formulae, R represents a polyhydric alcohol residue).

The epoxy compound (B) denotes an epoxy compound having an epoxy equivalent of 170 to 190 (or a number average molecular weight of 300 to about 400) and a viscosity at 25° C of 2,500 to 4,000 centipoises. Such an epoxy compound can be prepared, for example, by subjecting 1 mole of bisphenol F and 6 to 15 moles of β-methylepichlorohydrin or epichlorohydrin to a dehydrochlorination reaction at a reaction temperature of 60° to 120° C in the presence of, as a condensing agent, a basic substance such as sodium hydroxide, potassium hydroxide or calcium hydroxide.

Examples of the "unsaturated monobasic acid" (C) are acrylic acid, methacrylic acid, cinnamic acid, and crotonic acid. Reaction products formed between maleic acid and monohydric alcohols, such as methyl maleate, propyl maleate, butyl maleate or 2-ethylhexyl maleate, can also be used as the unsaturated monobasic acid (C). These compounds can be used either alone or in admixture of two or more.

The unsaturated polyester resin (I) used as a main ingredient of the resin composition of this invention can be obtained by reacting the epoxy compound (B) with the unsaturated monobasic acid (C) in the presence or absence of the dicarboxylic acid or carboxyl-terminated oligopolyester (A) at a temperature of 60° to 140° C, preferably 80° to 120° C. In order to shorten the reaction time and inhibit side reactions such as ring-opening etherification and thereby to increase the degree of esterification, this reaction may be carried out in the presence of a catalyst, such as tertiary amines (e.g., triethylamine, N,N-dimethyl benzylamine, N,N-dimethylaniline or diazacyclooctane) or amine salts (e.g., diethylamine hydrochloride, diethylamine acetate or dimethylamine sulfate). It is necessary, however, to choose those catalyst compounds which do not adversely affect the color and storage stability of the resulting resin, and the properties of the cured product. The most preferred amount of the catalyst is 0.1 to 0.5% by weight based on the resulting resin.

More conveniently, the reaction is carried out for 4 to 8 hours at 80° to 120° C in the presence of such a catalyst in the above-mentioned amount. The end point of the reaction is one at which the acid value of the resin approaches zero. For practical purposes, however, it is preferred that the equivalent ratio between the carboxylic acid component (A) and the epoxy compound (B) and the reaction time should be properly selected so as to stop the reaction at a point where the acid value of the resin is 5 to 15.

The unsaturated polyester resin (I) has a number average molecular weight of preferably about 450 to about 3,000, more preferably about 500 to about 2,000.

In order to prepare the resin composition of this invention, a conventional polymerizable vinyl monomer (II) is first blended with the resulting unsaturated polyester resin (I) to form a stable resin solution. At this time, a conventional curing catalyst may be added so as to form a curable composition having superior chemical resistance and more improved mechanical characteristics.

Typical examples of the polymerizable vinyl monomer (II) are styrene and its derivatives such as vinyltoluene, t-butylstyrene, chlorostyrene and divinylbenzene; (meth)acrylic ester monomers having low boiling points such as 2-ethylhexyl (meth)acrylate, lauryl (meth)acrylate, 2-hydroxyethyl (meth)acrylate, and 2-hydroxypropyl (meth)acrylate; and (meth)acrylates or polyhydric alcohols such as trimethylol propane tri(meth)acrylate, diethyl glycol di(meth)acrylate, 1,4-butanediol di(meth)acrylate, neopentyl glycol di(meth)acrylate, and 1,6-hexanediol di(meth)acrylate. These monomers can be used either alone or in admixture of two or more.

The mixing ratio between the unsaturated polyester resin (I) and the polymerizable vinyl monomer (II) can be varied over a considerably wide range. From the standpoint of the properties of the cured product, the amounts of the unsaturated polyester resin (I) and the polymerizable vinyl monomer (II) are preferably about 90 to 30% by weight, and 10 to 70% by weight, respectively, based on the total weight of (I) and (II). In order to enhance operability, a part, for example, 5 to 20% by weight, of the polymerizable vinyl monomer (II), may be replaced by a volatile solvent. All volatile solvents compatible with the resin composition can be used. Typical examples are alcohols such as methanol or ethanol, aromatic hydrocarbons such as benzene, xylene or toluene, and ketones such as acetone, methyl ethyl ketone and methyl isobutyl ketone.

Then, 1 to 20 parts by weight, based on the desired photocurable resin composition (I + II + III), of the photopolymerization initiator (III) is added to the resulting solution of the unsaturated polyester resin (I) in the polymerizable monomer (II), thereby to form the resin composition of this invention.

All compounds, which will photochemically activate the unsaturated polyester resin (I) and the polymerizable vinyl monomer (II) upon the irradiation of actinic light to induce a photopolymerization reaction easily, can be used as the "photopolymerization initiator" (III). Typical examples of the photopolymerization initiator include acyloins and their derivatives such as benzoin, benzoin methyl ether, benzoin ethyl ether, benzoin propyl ether, benzoin isobutyl ether, and α-methyl benzoin; ketones such as 2-methylanthraquinone, cyclohexanone or 9-fluorenone; organic sulfides such as diphenyl monosulfide, diphenyl disulfide, decylphenyl sulfide or tetramethyl thiuram sulfide; phenones such as acetophenone, benzophenone, phenyl-2-thienylketone or p,p-tetramethyldiaminobenzophenone; sulfonyl chlorides such as p-toluenesulfonyl chloride, 1-naphthalenesulfonyl chloride, 2-naphthalenesulfonyl chloride, 1,3-benzenedisulfonyl chloride, 2,4-dinitrobenzenesulfonyl chloride or p-acetamidebenzenesulfonyl chloride; halogenated hydrocarbons such as carbon tetrachloride, carbon tetrabromide, hexabromoethane, iodoform, 1,1,2,2-tetrabromoethane or decyl bromide; and dyes such as eosine, thionine, fluorescein, riboflavine or 3,6-diaminoacridine. These compounds can be used either alone or in admixture of two or more.

Together with such a photopolymerization initiator, a moderate amount of a photopolymerization promotor such as tertiary amine compounds, mercapto compounds, amino-alcohols, or phosphine derivatives can also be used.

Irradiation of actinic light on the resulting photocurable resin composition of this invention gives a cured product. Suitable light sources for generating such actinic light are those which generate light with a wavelength in the range of 2,000 to 5,000 A. Examples of the light sources are a mercury vapor lamp, a carbon arc lamp, an ultraviolet fluorescent lamp, a tungsten lamp, a xenon lamp, an argon glow lamp, a photoreflector lamp, and sunlight.

Moderate heating may be used together in irradiating actinic light to the photocurable resin composition of this invention. Heating may be done in the presence of a heat-curing catalyst such as benzoyl peroxide, cumene hydroperoxide, di-tert.-butyl peroxide, or methyl ethyl ketone peroxide.

The following examples illustrate the present invention in greater detail. Unless otherwise indicated, percentages are by weight.

REFERENTIAL EXAMPLE 1 (Synthesis of a bisphenol F-type epoxy compound)

Epichlorohydrin (925 g) and 160 g of bisphenol F were charged into a flask, and dehydration was performed while adding 75 g of a 48% by weight aqueous solution of sodium hydroxide dropwise with stirring at 100 to 120° C, thereby to perform a ring-opening addition reaction.

After the reaction, the excess of epichlorohydrin was recovered, and the resulting sodium chloride was removed by filtration to afford an epoxy compound having an epoxy equivalent of 182 and a number average molecular weight (measured by a vapor phase osmometer; the same will apply hereinafter) of 370.

REFERENTIAL EXAMPLE 2 (Synthesis of a bisphenol F-type epoxy compound)

A flask was charged with 1,055 g of β-methyl epichlorohydrin and 160 g of bisphenol F, and by the same procedure as in Referential Example 1, an epoxy compound having an epoxy equivalent of 210 and a number average molecular weight of 430 was obtained.

REFERENTIAL EXAMPLE 3 (Synthesis of a bisphenol A-type epoxy compound)

The same procedure as in Referential Example 1 was repeated except that 228 g of bisphenol A was used instead of 160 g of bisphenol F. An epoxy compound having an epoxy equivalent of 210 and a number average molecular weight of 425 was obtained.

REFERENTIAL EXAMPLE 4 (Synthesis of a carboxyl-terminated oligopolyester)

A reactor was charged with 456 g of adipic acid and 210 g of dipropylene glycol, and while introducing an inert gas with stirring, they were reacted for 3 hours at 180° C, and then for 6 hours at 200° C. A carboxyl-terminated oligopolyester having an acid value of 282 and a number average molecular weight, measured by an end-group analysis (the same will apply hereinafter), of 385 was obtained.

REFERENTIAL EXAMPLES 5 to 9 (Synthesis of carboxyl-terminated oligopolyesters)

A reactor was charged with 476 g of adipic acid together with 362 g of dipropylene glycol (Referential Example 5), 174 g of diethylene glycol (Referential Example 6), 192 g of 1,6-hexanediol (Referential Example 7), 170 g of neopentyl glycol (Referential Example 8), or 476 g of polypropylene glycol having a number average molecular weight of about 400. Repeating the same procedure as in Referential Example 4 afforded carboxyl-terminated oligopolyesters having an acid value of 167, 295, 286, 304 and 167, respectively and a number average molecular weight of 672, 380, 392, 369 and 671, respectively.

REFERENTIAL EXAMPLE 10 (Synthesis of a carboxyl-terminated oligopolyester)

A reactor was charged with 580 g of sebacic acid and 192 g of dipropylene glycol, and the same procedure as in Referential Example 4 was repeated. A carboxyl-terminated oligopolyester having an acid value of 223 and a number average molecular weight of 503 was obtained.

REFERENTIAL EXAMPLE 11 (Synthesis of a carboxyl-terminated oligopolyester)

The same procedure as in Referential Example 4 was repeated using 159 g of adipic acid and 377 g of a propylene oxide adduct of bisphenol A as starting materials. A carboxyl-terminated oligopolyester having an acid value of 118 and a number average molecular weight of 951 was obtained.

REFERENTIAL EXAMPLE 12 (Preparation of an unsaturated monobasic acid component)

A reactor was charged with 32 g of methanol and 98 g of maleic acid, and while introducing an inert gas with stirring, they were reacted at 80° C for 6 hours. Monomethyl maleate having an acid value of 472 was obtained.

REFERENTIAL EXAMPLE 13 (Preparation of an unsaturated monobasic acid component)

In the same way as in Referential Example 12, mono-n-butyl maleate having an acid value of 360 was obtained from 74 g of n-butanol and 98 g of maleic acid.

EXAMPLES 1 to 3

A reactor was charged with 710 g of the epoxy compound obtained in Referential Example 1, and then 290 g of acrylic acid, and 3 g of N,N-dimethyl benzylamine were added. The reaction was performed at 100° C for 4 hours to afford an unsaturated polyester resin (I) having an acid value of 8.6 and a number average molecular weight (as measured by a vapor phase osmometer; the same will apply hereinafter) of 510. 2-Hydroxypropyl acrylate [polymerizable vinyl monomer (II)] to which 100 ppm of hydroquinone monomethyl ether had been added was added to the resulting polyester resin in the amounts shown in Table 1 to afford resin solutions having the viscosities indicated in Table 1.

One part by weight of benzoin methyl ether as a photopolymerization initiator (III) was added to 100 parts by weight of each of the resin solutions and dissolved uniformly therein. Thus, photocurable resin compositions were obtained.

Each of the resulting photocurable resin compositions was coated in a customary manner on a tip-plated steel plate washed with a solvent. The coated surface was exposed to the irradiation of light from a 2-kw high-tension quickselver lamp in an atmosphere of air under the conditions shown in Table 2. The resulting test pieces were examined for the properties of the coated films.

The results are shown in Table 2.

EXAMPLES 4 to 6

An unsaturated polyester resin (I) having an acid value of 8.2 and a number average molecular weight of 570 was prepared in the same manner as in Example 1 to 3 using 290 g of acrylic acid and 710 g of the epoxy compound obtained in Referential Example 2. The polymerizable vinyl monomer (II) was added in the amounts shown in Table 1 to the resulting unsaturated polyester resin (I) to form resin solutions. Furthermore, photopolymerization initiator (III) was added to the resin solutions in the same way as in Examples 1 to 3 to form photocurable resin compositions. Test pieces were prepared from the resulting compositions and examined for the properties of the coated films. The results are shown in Table 2.

Comparative EXAMPLES 1 to 3

An unsaturated polyester resin having an acid value of 8.0 and a number average molecular weight of 570 was prepared in the same way as in Examples 1 to 3 using 265 g of acrylic acid and 735 g of the epoxy compound obtained in Referential Example 3. Test pieces were obtained by the same method as in Examples 1 to 3, and examined for the properties of the coated films. The results are shown in Table 2.

Comparative EXAMPLE 4

A reactor was charged with 524 g of the epoxy compound obtained in Referential Example 3, and 382 g of dimeric acid and 0.9 g of dimethyl benzylamine (catalyst) were added. The reaction was carried out at 100° C for 4 hours to form a reaction product having an acid value of 5. 9.4 g of acrylic acid was added to the reaction product, and further 2.5 g of dimethyl benzylamine was added as a catalyst. The reaction was carried out at 100° C for 4 hours to afford an unsaturated polyester resin having an acid value of 8.2 and a number average molecular weight of 790.

2-Hydroxypropyl acrylate as a polymerizable monomer was added in the amounts indicated in Table 1 to the resulting unsaturated polyester resin to form resin solutions. The photopolymerization initiator was added to the resin solutions in the same way as in Examples 1 to 3 to afford resin compositions. Test pieces were prepared from the resulting resin compositions.

The viscosities of the resin solutions are shown in Table 1, and the results of tests on the properties of the test pieces are shown in Table 2.

EXAMPLES 7 to 9

An unsaturated polyester resin (I) having an acid value of 6.0 and a number average molecular weight of 540 was prepared in the same way as in Examples 1 to 3 from 250 g of acrylic acid, 59 g of cinnamic acid and 712 g of the epoxy compound obtained in Referential Example 1.

In the same way as in Examples 1 to 3, resin solutions were prepared from this unsaturated polyester resin (I); then photocurable resin compositions were prepared; and test pieces were made (see Table 1 and 2).

Table 1

|  | Acid value of the unsaturated polyester resin (I) | Amount (%) of the polymerizable vinyl monomer (2-hydroxypropyl acrylate) | Viscosity of the resin solution (Gardner viscosity) |
|---|---|---|---|
| Examples |  |  |  |
| 1 | 8.6 | 30 | X-Y |
| 2 | 8.6 | 40 | P-Q |
| 3 | 8.6 | 55 | $A_1$-A |
| 4 | 8.2 | 30 | X-Y |
| 5 | 8.2 | 40 | $Q^2$-R |
| 6 | 8.2 | 55 | B-C |
| 7 | 6.0 | 30 | $X^2$-Y |
| 8 | 6.0 | 40 | N-O |
| 9 | 6.0 | 55 | J-K |
| Comparative Examples |  |  |  |
| 1 | 8.0 | 30 | $X-Y^2$ |
| 2 | 8.0 | 40 | S-T |
| 3 | 8.0 | 55 | E-F |
| 4 | 8.2 | 40 | Y-Z |

Table 2

|  | Irradiation time (seconds) | Examples Amount of the polymerizable monomer (%) | | Comparative Examples Amount of the polymerizable monomer (%) | |
|---|---|---|---|---|---|
| Properties |  | 30 | 55 | 30 | 55 |
| Pencil hardness | 20 | H – 2H | F | below 6B (unmeasurable) | HB |

Table 2-continued

|  | Irradiation time (seconds) | Examples Amount of the polymerizable monomer (%) | | Comparative Examples Amount of the polymerizable monomer (%) | |
| --- | --- | --- | --- | --- | --- |
| Properties | | 30 | 55 | 30 | 55 |
| Methyl ethyl ketone rubbing test* | 30 | 2H | H | H | H |
| | 20 | Excellent | Good | Fair to poor | Fair to poor |
| | 30 | Excellent | Excellent | Fair | Fair |

*The "methyl ethyl ketone rubbing test" was performed by rubbing the sample with methyl ethyl ketone 100 times, and then the sample was evaluated on the following standard.
Excellent: No effect, and no change in surface gloss.
Good: Surface gloss loss slightly, but no rubbing-off.
Fair: Surface gloss lost considerably, and rubbing-off occurred partly.
Poor: Rubbing-off occurred wholly.

EXAMPLES 10 to 16

A reactor was charged with the epoxy compound obtained in Referential Example 1, a carboxyl-terminated oligopolyester obtained in the same way as in Referential Example 4 using adipic acid and a polyhydric alcohol in the molar ratios shown in Table 3, and acrylic acid in the proportions shown in Table 4. They were reacted in the same way as in Comparative Example 4 to afford unsaturated polyester resins (I).

The number average molecular weights of the carboxyl-terminated oligopolyesters and of the unsaturated polyester resins (I) are shown in Table 3.

Table 3

| Example | | Number average molecular weights | |
| --- | --- | --- | --- |
| | | Carboxy-terminated oligopolyester | Unsaturated polyester resin |
| 10 | Adipic acid/dipropylene glycol=3/2 | 672 | 1,560 |
| 11 | Adipic acid/dipropylene glycol=2/1 | 390 | 1,300 |
| 12 | Adipic acid/diethylene glycol=2/1 | 380 | 1,260 |
| 13 | Adipic acid/1,6-hexanediol=2/1 | 392 | 1,300 |
| 14 | Adipic acid/neopentyl glycol=2/1 | 361 | 1,270 |
| 15 | Adipic acid/polypropylene glycol used in Examples 5 to 9=2/1 | 671 | 1,600 |
| 16 | Adipic acid/a propylene oxide adduct of bis- | 660 | 1,550 |

Table 3-continued

| Example | | Number average molecular weights | |
| --- | --- | --- | --- |
| | | Carboxy-terminated oligopolyester | Unsaturated polyester resin |
| | phenol A=2/1 | | |

70% Styrene solutions of these unsaturated polyester resins (I) were prepared. In the same way as in Examples 1 to 3, photopolymerizable resin compositions were prepared, and test piece were made from the resulting resin compositions.

The acid values of the unsaturated polyester resins (I), the viscosities of the 70% resin solutions, and the results of the tests on the primary and secondary properties of the test pieces are shown in Table 4.

EXAMPLE 17

An unsaturated polyester resin having a number average molecular weight of 900 was prepared by the same procedure as in Comparative Example 4 from 463 g of the epoxy compound obtained in Referential Example 1, 122 g of a carboxyl-terminated butadiene/acrylonitrile copolymer having a number average molecular weight of about 3,800, and 171 g of acrylic acid.

The acid value of the unsaturated polyester resin, the viscosity of a solution of this resin, and the primary and secondary properties of test pieces prepared from the unsaturated polyester resin in the same way as in Examples 10 to 16 are shown in Table 4.

Table 4

| Example | Mole ratio of epoxy compound/oligopolyester/acrylic acid | Acid value of the unsaturated polyester | Viscosity of the resin solution (cps) | Primary properties | | | | | |
| --- | --- | --- | --- | --- | --- | --- | --- | --- | --- |
| | | | | Scratch adhesion | Cross hatch adhesion | Du Pont impact (g-cm) Direct | Reverse | Bending (diameter 2 mm) | Erichsen |
| 10 | 4/1.9/1.9 | 8.0 | 1,100 | Excellent | 100/100 | >1000-50 | | Excellent | >6 |
| 11 | " | 8.0 | 700 | Good to excellent | 96/100 | " | | Excellent | " |
| 12 | " | 8.2 | 940 | Excellent | 98/100 | " | | Excellent | " |
| 13 | " | 8.0 | 770 | Excellent | 100/100 | " | | Excellent | " |
| 14 | " | 8.4 | 850 | Excellent | 100/100 | " | | Excellent | " |
| 15 | " | 7.9 | 640 | Good to excellent | 99/100 | " | | Excellent | " |
| 16 | " | 8.2 | 4,500 | Excellent | 100/100 | " | | Excellent | " |
| 17 | " | 8.0 | 1,200 | Excellent | 100/100 | " | | Excellent | " |

| Example | Secondary properties | | | | | |
| --- | --- | --- | --- | --- | --- | --- |
| | Scratch adhesion | Cross hatch adhesion | Du Pont Impact (g-cm) Direct | Reverse | Bending | Erichsen |
| 10 | Good | 100/100 | 1000-30 | 1000-35 | Excellent | >6 |
| 11 | Good to excellent | 100/100 | >1000-50 | | Excellent | " |
| 12 | Good to excellent | 99/100 | 1000-30 | | Excellent | " |

Table 4-continued

| | | | | | |
|---|---|---|---|---|---|
| 13 | Excellent | 100/100 | >1000–50 | Excellent | " |
| 14 | Excellent | 100/100 | 1000–30 | Excellent | " |
| 15 | Good | 98/100 | >1000–50 | Excellent | " |
| 16 | Good to excellent | 100/100 | >1000–50 | Excellent | " |
| 17 | Fair | 85/100 | >1000–50 | Excellent | " |

Note 1

As a polymerizable vinyl monomer, 30% by weight of styrene was used.

Note 2

The primary properties were those measured of as-prepared test samples; and the secondary properties, those measured of test samples after boiling for 30 minutes in water.

Note 3

The coating base material was a 0.5 mm tinplated steel plate treated with a No. 400 sand paper.

Note 4

Standards of evaluation were as follows:
Excellent: no peeling observed
Good: slight peeling observed
Fair: considerable peeling observed.

What we claim is:

1. A photocurable resin composition comprising
   (I) an unsaturated polyester resin obtained by reacting (B) an epoxy compound containing at least about 2 epoxy groups per molecule obtained by reacting methylidene diphenol with β-methylepichlorohydrin or epichlorohydrin, with (C) an unsaturated monobasic acid in the presence or absence of (A) a dicarboxylic acid containing at least 4 methylene groups interposed between the two carboxyl groups, or a carboxyl-terminated oligopolyester obtained by esterifying a saturated or unsaturated dibasic acid with a polyhydric alcohol,
   (II) a polymerizable vinyl monomer capable of addition polymerization with the unsaturated polyester resin (I), and
   (III) a photopolymerization initiator having an action of promoting radical polymerization by the irradiation of light.

2. The composition of claim 1 wherein the dicarboxylic acid (A) contains 4 to 200 methylene groups interposed between the two carboxyl groups.

3. The composition of claim 1 wherein the oligopolyester (A) has a number average molecular weight of 300 to 3,000.

4. The composition of claim 1 wherein the epoxy compound (B) has an epoxy equivalent of 170 to 190 and a viscosity at 25° C of 2,500 to 4,000.

5. The composition of claim 1 wherein the unsaturated monobasic acid (C) is acrylic acid, methacrylic acid, cinnamic acid, crotonic acid, or a reaction product of maleic acid with a monohydric alcohol.

6. The composition of claim 1 wherein the unsaturated polyester (I) has a number average molecular weight of 450 to 3,000.

7. The composition of claim 1 which comprises 90 to 30% by weight of the unsaturated polyester resin (I) and 10 to 70% by weight of the polymerizable vinyl monomer (II), both being based on the total weight of (I) and (II), and 1 to 20 parts by weight, based on the entire composition (I + II + III), of the photopolymerization initiator (III).

* * * * *